United States Patent [19]

Dinh

[11] Patent Number: 4,938,035
[45] Date of Patent: Jul. 3, 1990

[54] REGENERATIVE FRESH-AIR AIR CONDITIONING SYSTEM AND METHOD

[76] Inventor: Khanh Dinh, 1618 SW.76 Ter., Gainesville, Fla. 32607

[21] Appl. No.: 288,159

[22] Filed: Dec. 22, 1988

Related U.S. Application Data

[63] Continuation-in-part of Ser. No. 110,420, Oct. 20, 1987, Pat. No. 4,827,733.

[51] Int. Cl.⁵ .............................................. F25B 47/00
[52] U.S. Cl. ....................................... 62/279; 62/305; 62/506
[58] Field of Search ................... 62/305, 181, 279, 506

[56] References Cited

U.S. PATENT DOCUMENTS

| | | | |
|---|---|---|---|
| 2,071,026 | 2/1937 | Crosley, Jr. | 62/305 |
| 3,402,760 | 9/1968 | Cohen | 165/21 |
| 3,872,684 | 3/1975 | Scott | 62/305 X |
| 3,926,000 | 12/1975 | Scofield | 62/305 X |
| 3,938,352 | 2/1976 | Schmidt | 62/305 X |
| 4,048,811 | 9/1977 | Ito et al. | 62/263 |
| 4,182,131 | 1/1980 | Marshall et al. | 62/91 |
| 4,494,384 | 1/1985 | Lott | 62/305 X |
| 4,570,448 | 2/1986 | Smith | 62/89 |
| 4,688,626 | 8/1987 | Tengesdale | 165/4 |
| 4,708,000 | 11/1987 | Besik | 62/480 |
| 4,708,197 | 11/1987 | Robbins | 165/54 |
| 4,713,943 | 12/1987 | Wainwright | 62/304 |

*Primary Examiner*—Lloyd L. King
*Attorney, Agent, or Firm*—Foley & Lardner, Schwartz, Jeffery, Schwaab, Mack, Blumenthal & Evans

[57] ABSTRACT

A regenerative fresh-air air conditioning system moves ingoing and outgoing air through a building structure and includes an ingoing air portion wherein the ingoing air is filtered and then pre-cooled by a pre-cooling heat pipe. The ingoing air is then moved by a blower to an evaporator where the air is further cooled and a resulting condensate forms. The cooled air is then supplied to the building by a supply register. Outgoing air passes across a wet heat pipe which is wetted by the condensate from the evaporator and may also be wetted by condensate from the pre-cooling heat pipe. The outgoing air is then sub-cooled and mixed with fresh air by a fan which moves the mixed fresh and outgoing air across a condenser and exhausts the mixed air from the building structure.

12 Claims, 6 Drawing Sheets

REGENERATIVE FRESH-AIR AIR CONDITIONING SYSTEM AND METHOD

CROSS REFERENCE TO RELATED APPLICATION

This is a continuation-in-part of U.S. application Ser. No. 110,420 filed Oct. 20, 1987, now Pat. No. 4,827,733, the entire disclosure of which is incorporated herein by reference.

BACKGROUND OF THE INVENTION

1. Field of the Invention

This invention relates to air and heat exchange systems and more specifically to an air and heat exchange system which is able to provide a high ventilation rate for a structure without adversely affecting the heating or cooling efficiency of the structure.

2. Discussion of Related Art

The high incidence of radon gas accumulation in residential and commercial structures has brought public attention to a potentially significant health threat. Radon gas is a pollutant which the public has taken significant notice of in the past few years. This gas is constantly being released from the ground in certain areas of the country. The gas is produced by the gradual decay of uranium and is both colorless and tasteless. The Environmental Protection Agency (EPA) has estimated that as many as 20,000 lung cancer deaths each year are attributable to radon exposure.

This health threat is due in some part to new construction techniques and energy conservation measures which have been introduced in the past several years. These techniques have led to relatively air-tight building construction which results in much less passive air-exchange than in the not-so-air-tight buildings of the past. This lack of air-exchange has caused indoor air quality to suffer dramatically.

Radon is not the only indoor air pollutant which has become a problem in the past several years, however. As air-quality problems are exacerbated by the lack of air-exchange in buildings, pollutants such as formaldehyde, carpet insecticides, trapped odors, and cigarette smoke have become significant health threats. Clearly, a solution needs to be found, especially for those individuals living or working in buildings having pollutants above EPA "safe" levels.

One of the best methods of mitigating indoor air pollution is to increase the amount of air ventilation taking place. Unfortunately, unless there is some form of heat or cooling recovery, increased ventilation is very energy-consumptive.

The foregoing illustrates limitations known to exist in present systems and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an air conditioning system and method for moving ingoing and outgoing air through a building structure comprising ingoing air which is filtered and then pre-cooled by a precooling heat pipe. The ingoing air is then moved by a blower to an evaporator where the air is further cooled and a resulting condensate forms. The cooled air is then supplied to the building by a supply register. Outgoing air passes across a wet heat pipe which is wetted by the condensate from the evaporator. The outgoing air is then heated and mixed with fresh air by a fan which moves the mixed fresh and outgoing air across a condenser and exhausts the mixed air from the building structure.

BRIEF DESCRIPTION OF THE DRAWINGS

The above and other objects and advantages of the present invention will become more readily apparent as the invention becomes more fully understood from the detailed description to follow, reference being had to the accompanying drawings in which like reference numerals represent like part throughout and wherein.

DETAILED DESCRIPTION OF THE PREFERRED EMBODIMENTS

The present invention provides an air exchange system for moving an ingoing airstream to and exhausting an outgoing airstream from a building structure. The system utilizes the heat pipe concept and the control of humidity, in an extremely effective air-exchanger, exchanging not only sensible heat but latent heat as well. Such an air-exchanger allows tight buildings a much greater exchange of air with the outside environment, in the most energy-efficient manner currently available.

The term "heat pipe heat exchanger" is used herein. This type of structure is well known and is often simply referred to as a "heat pipe." A more complete description of the construction and operation of a heat pipe is set forth in my copending U.S. application Ser. No. 110,420 filed Oct. 20, 1987, which is incorporated herein by reference.

Figure 1:
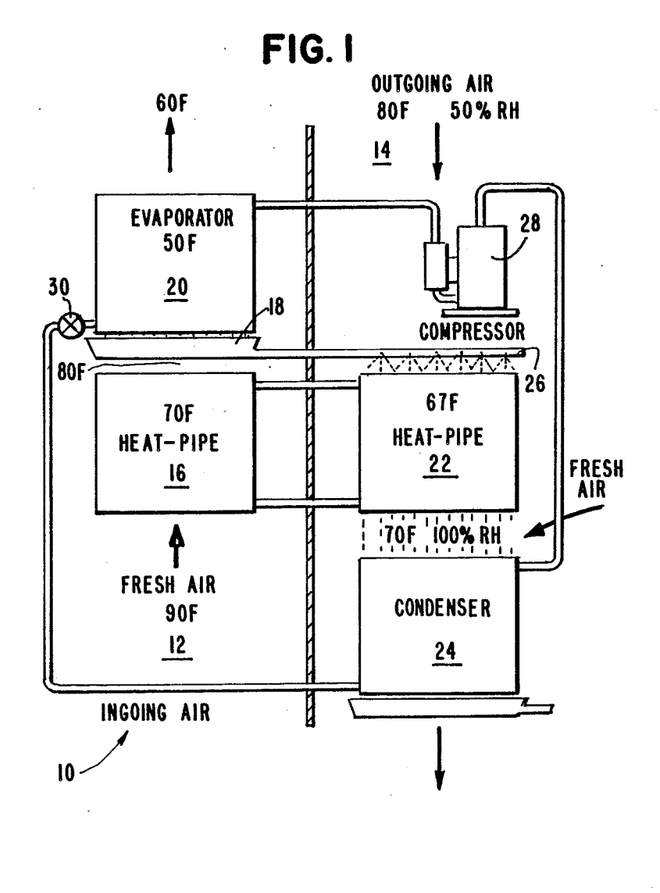
FIG. 1 is a schematic view illustrating the operating principles of the present invention.
Figure 2:
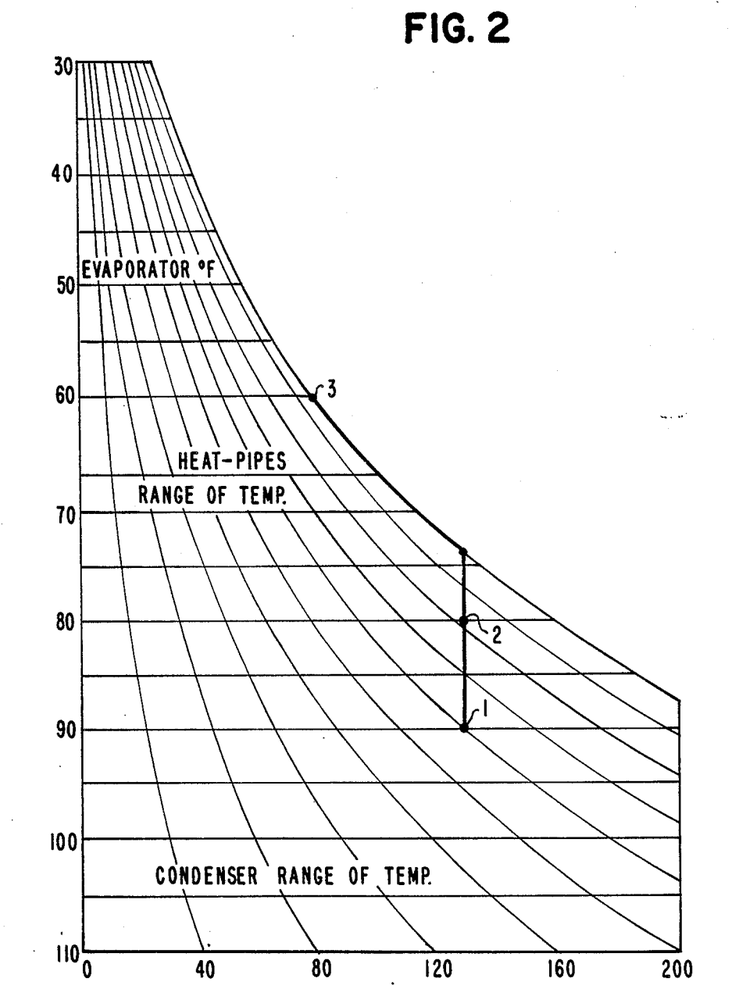
FIG. 2 is a psychrometric chart for explaining heat and humidity transfer in the ingoing airstream processes of the system of the present invention.
Figure 3:
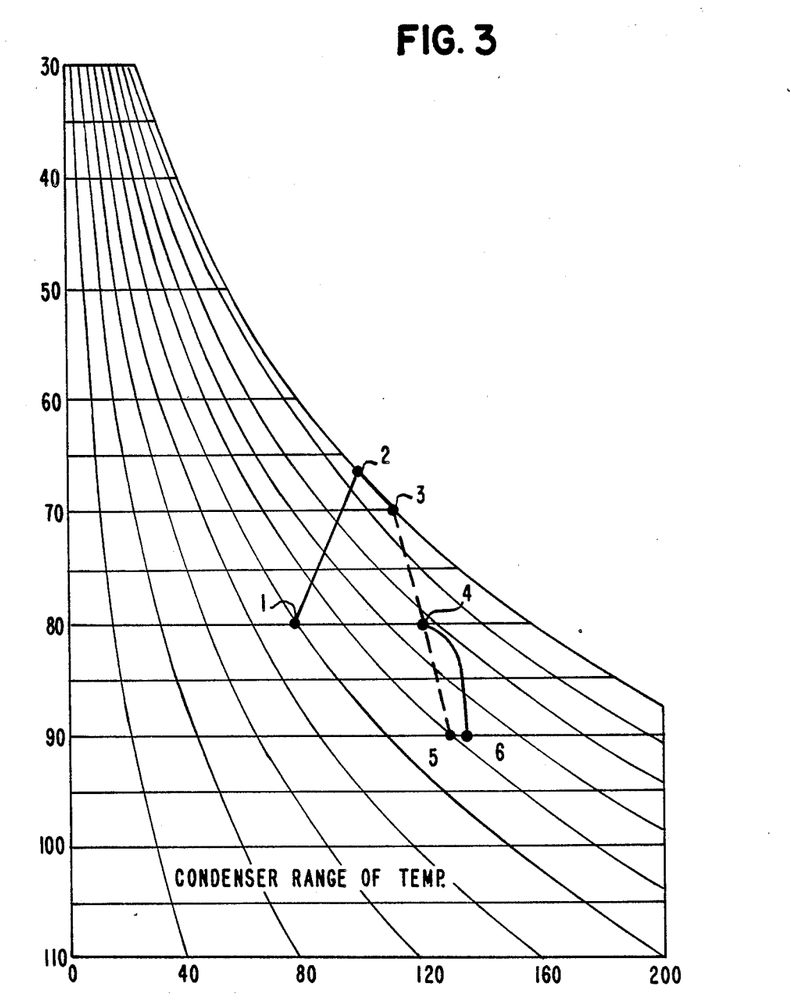
FIG. 3 is a psychrometric chart for explaining the heat and humidity transfer in the outgoing airstream processes of the system of the present invention.

The operation of the system of the present invention can be understood with reference to FIGS. 1–3. FIG. 1 shows the basic system components necessary for an understanding of the invention. The basic system is generally designated 10 and includes an ingoing air flow portion 12 through which air is brought into a structure being ventilated, and an outgoing air flow portion 14 through which air is exhausted from the structure. Ingoing air flow portion 12 includes a heat pipe portion 16 of a heat pipe heat exchanger which pre-cools the ingoing air, a condensate collection apparatus 18, and an evaporator 20 of a conventional vapor compression cycle air conditioner. In the actual physical system, other components such as blowers and filters are also included, as will be discussed below.

With reference to FIGS. 1 and 2, during summer operation, it will be seen that the ingoing air stream is pre-cooled in the heat pipe 16. For example, when the system is used in an exemplary 1,500 square foot structure and the ingoing flow rate is 250 CFM, if the ingoing air starts at a temperature of 90 degrees F. at point 1 in FIGS. 1 and 2, its temperature will be reduced to about 80 degrees F. at point 2. The humidity level will remain about the same, as is apparent from FIG. 2. The heat pipe heat portion 16 would operate in this example at about 70 degrees F. The ingoing air stream temperature is further reduced to about 60 degrees F. in evaporator 20 which operates at a temperature of about 50 degrees F. and provides about a 7,500 BTU cooling effect. The humidity ratio of the ingoing airstream is also reduced in the evaporator 20 from about 128 to about 76. The moisture removed in this process is caught in the condensate collection apparatus 18 and used in the outgoing airstream processes, as discussed below. As will be understood from the foregoing, between points 1 and 2, sensible cooling is effected by the heat pipe portion 16 and between points 2 and 3, sensible and latent cooling is effected by evaporator 20.

The outgoing airstream is passed through the heat pipe portion 22 and then through the condenser 24 of the air conditioner. The condensate in the condensate collection apparatus 18 is channeled to a nozzle 26 and uniformly distributed over the heat pipe portion 22. In this manner, the condensate evaporatively cools the heat pipe portion 22 below dry-bulb in order to transfer the latent heat and increase the efficiency of the system. The outgoing air is also cooled by evaporative cooling and has its humidity increased. This is made clear in FIG. 3 wherein an 80 degree F. outgoing airstream at 200 CFM is assumed. In FIG. 3, it can be seen that the temperature of the air is decreased to about 67 degrees F. from about 80 degrees F. while passing from point 1 to point 2 in the outgoing air path. This lowering in temperature is due to the evaporative cooling affect. The temperature of the outgoing air is then raised slightly to about 70 degrees F. as it passes from point 2 to point 3 through the heat pipe portion 22 so that the heat extracted from the ingoing air by the pre-cooler portion 16 of the heat pipe heat is given up to the outgoing air. The humidity ratio of the air is also increased from about 76 to about 98 as it passes from point to point 2 through the evaporative cooling portion of the outgoing air system. The humidity is raised further to about 110 as the outgoing air passes through the heat pipe portion 22 due to the presence of the condensate on the coils of this unit. The temperature and humidity of the air are increased further by mixing the outgoing air with ambient outside air as the outgoing air travels from point 3 to point 4. The ambient outside air is received from point 5 in FIG. 1. In this portion of the system, condensate may continue to flow thereby contributing to the increase in the humidity of the outgoing air stream. In the example given, as shown in FIG. 3, if the outside ambient air at point 5 is at about 90 degrees F. with a 128 humidity ratio, the air at point 4 will be at about 80 degrees with a 120 humidity ratio. The outgoing air is then heated again in the condenser 24 to a final temperature of about 90 degrees F. at point 6. The condensate from nozzle 26 is permitted to cover the condenser 24 so that the humidity ratio of the outgoing air is raised to about 134 as the air passes to point 6.

As shown in FIG. 1, the evaporator 3 and the condenser 24 are part of a conventional vapor compression cycle air conditioning system which includes compressor 28 and expansion valve 30. Further elements of the system will be discussed below with reference to the remaining drawings.

Figure 4:
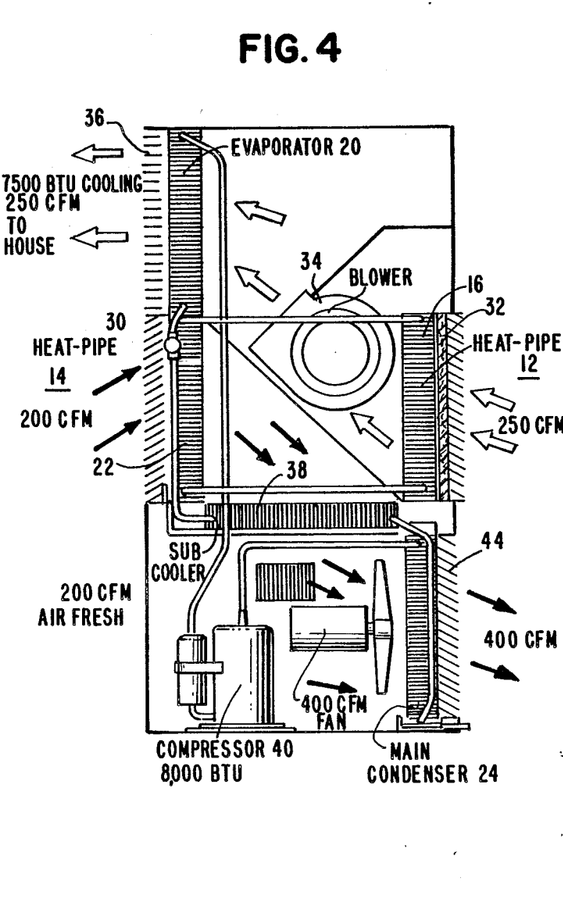
FIG. 4 is a side elevational view of one embodiment of a system according to the present invention.

The air conditioner system may be a small 8000 BTUh nominal unit. The overall system may comprise a cabinet physically separated into two sections, with one section used for the in-going air stream and the other section used for the out-going air stream. This arrangement is shown in FIG. 4. In the in-going air stream 12 are located an air filter 32, the precooling portion 16 of the heat-pipe, a blower 34, the evaporator and a supply register. In the out-going airstream are located the wet heat-pipe portion 22 of the heat pipe heat exchanger which receives the condensate from the evaporator 20, a sub-cooler 38, a fan 40 with a lateral fresh air mixing register 42, the main condenser 24 and a discharge grill 44.

It will be noted that in the configuration of FIG. 4, there is no need for the condensate collection apparatus. The evaporator 20 and the wet pipe portion of the heat pipe heat exchanger are built into a fin coil which shares the same housing and fins. These components are arranged in the housing so that the wet pipe portion 22 is directly below the evaporator 20. In this manner, the condensate from the evaporator 20 is allowed to fall directly on the wet pipe portion.

The blower 34 draws the ingoing air through the pre-cooling portion 16 and forces it through the evaporator 20. As discussed above, this results in a condensate being formed. Also, a condensate may be formed by the pre-cooling heat pipe portion 16. The supply register 36 supplies the ingoing air to an adjacent building structure.

The movement of the outgoing air stream 14 is controlled by the fan 40. The fan 40 pulls the outgoing air through wet heat pipe portion 22 which is wetted and cooled by evaporation of the condensate from evaporator 20 and may in addition be wetted by any condensate produced by the pre-cooling heat pipe portion 16 (structure for accomplishing this would be apparent to one skilled in the art). Air in the outgoing air portion 14 also moves across the subcooler 38. Sub-cooler 38 receives liquid freon from the condenser 24 and sub-cools the freon before passing it to the expansion valve 30. This increases the efficiency of the system. The fresh air register 42 introduces outside fresh air to be mixed with the outgoing air. The fan 40 mixes and moves the fresh air and the outgoing air. The mixed fresh air and outgoing air are exhausted from the building structure across condenser 24 and through the outgoing air register 44.

The heat transfer processes explained above with reference to the diagrams and psychometric charts of FIGS. 1–4 relate to operation in the summer when incoming air is to be cooled and the heat transferred to the outgoing air. The vapor compression cycle is conventional with a compressor, condenser, expansion valve and evaporator. Regular freon 22 is used as refrigerant. Controls for the system may include an outdoor temperature/humidity sensor which turns the intake blower on high-speed and shuts off the compressor under certain outdoor conditions, when air conditioning is not required. This will ventilate the building structure with fresh air and save air-conditioning energy.

The system may also be used to ventilate a structure during the winter months. In this case, the compressor 28 may be turned off. Thus the incoming air will be heated in heat pipe portion 16 and the outgoing air will be cooled in the heat pipe portion 22. Heat pipe portion 22 will be operated in a dry state. Further, the vapor compression cycle air conditioning system may be in the form of a heat pump in which case appropriate known valves will reverse the flow of freon between components 20 and 24 so that the evaporator 20 works as a condenser and the condenser 24 works as an evaporator. In this case, the ingoing air is pre-heated in the heat pipe portion 16 and is heated further in the component 20. The outgoing air is cooled in heat pipe portion 22 and further cooled in the component 24, the extracted heat being added to the ingoing air.

Modern homes have a low rate of air exchange, typically one air-change every two hours (0.5 ACH). This low rate of air exchange is one of the primary reasons an air exchange system is necessary.

The average size of a new home is approximately 1,500 square feet. For this reason, the present invention addresses the requirements of an exemplary 1,500 square foot house.

The system is designed to bring in 250 CFM (cubic feet per minute) of outside air, but to exhaust only 200 CFM of indoor air, thereby maintaining a slight positive pressure in the house. This positive pressure is obtained by adjusting the rates of blower 34 and fan 40 in a known manner. Pressure of this nature within the home helps to lower the rate of radon infiltration.

A 1,500 square foot home with 8 foot high ceilings contains approximately 12,000 cubic feet of air. The system delivering 250 CFM of ingoing air will provide 1.25 air changes per hour to the existing passive air change of 0.5 per hour, for a total of 1.75 ACH. It is estimated that this increase in air exchange, coupled with the increase in positive pressure in the house, will result in a 75% decrease in radon levels in the average situation (actual levels of radon infiltration and air change will vary).

Research has shown that of the 8 million homes the EPA estimates to have radon infiltration, 40% have levels above 4 picocuries, while only 5% have levels in excess of 15 picocuries. The average home with a radon level of 15 picocuries could be reduced to a level below 4 picocuries by means of the present invention.

From the foregoing discussion, it can be seen that the present invention is advantageous in several ways.

The use of heat-pipes to heat-exchange heat where one end of the heat-pipe is wetted by condensate and evaporatively cooled below dry-bulb results in a transfer the latent heat (the moisture from outside air condenses on the evaporator and one end of the heat-pipe, is transferred to the other end of the heat pipe where it re-evaporates and goes out with the exhaust air) as well as the sensible heat from the ingoing air to the outgoing air.

A small vapor compression cycle is employed to provide additional cooling and also provide the condensate to wet the heat-pipe.

The vapor compression cycle being combined with the heat-exchanger compensates for the extra-load introduced with the fresh air. However, it should be noted that the concept of using condensate from the evaporator to evaporatively cool the condenser can be used in any conventional vapor cycle air conditioner to increase its efficiency regardless of whether fresh air is introduced or whether a heat pipe is used.

The system can be used with an outdoor control to lock out the regular central AC system and switch on a high fan speed to bring in extra fresh air when outdoor conditions are more comfortable than in the building, to save energy. That is, the system blower 34 and fan 40 may have variable motors. The motors speeds may be increased when the outside temperature drops to a point where the added cooling of the air conditioner is not necessary.

The evaporator 20 and the heat-pipe portion 16 may be built in one single fin coil as discussed above with reference to FIG. 4, or the evaporator 20, heat pipe portion 16, and condenser 24 may all be built in one single fin-coil as will be discussed below. In this manner, the condensation forming on the evaporator will drip down along the fins and distribute perfectly fin by fin over the heat-pipe where it re-evaporates to increase the efficiency of the coils which it contacts. If there is a small amount of condensate, it may evaporate entirely on the heat pipe. However, if the out-going airstream over the heat pipe does not evaporate all the condensate, the excess will continue to drip on the sub-cooler and condenser which will finish the evaporation. This evaporation will also lower the sub-cooler and condenser temperatures, insuring better efficiency.

The in-flow and out-flow of air are not absolutely set, but are left to adopt a natural equilibrium according to the internal/external pressure of the building, and the condenser fan is provided to pull out less air than the fresh air fan pushing in, to build a slight positive pressure in the building if possible to minimize infiltration of radon gas and to prevent the undesirable suction of combustion gases from a furnace, for example.

An outdoor air vent is provided to bring extra fresh air to the condenser in case the building is under negative pressure (for example some bathroom ventilators are sucking air out from the other end of the building) and the out-going airstream is greatly reduced. Normally, this partial fresh air mixes with the cool air from the building, and the proportion of the mix is naturally dictated by the pressure in the building.

Figure 5:
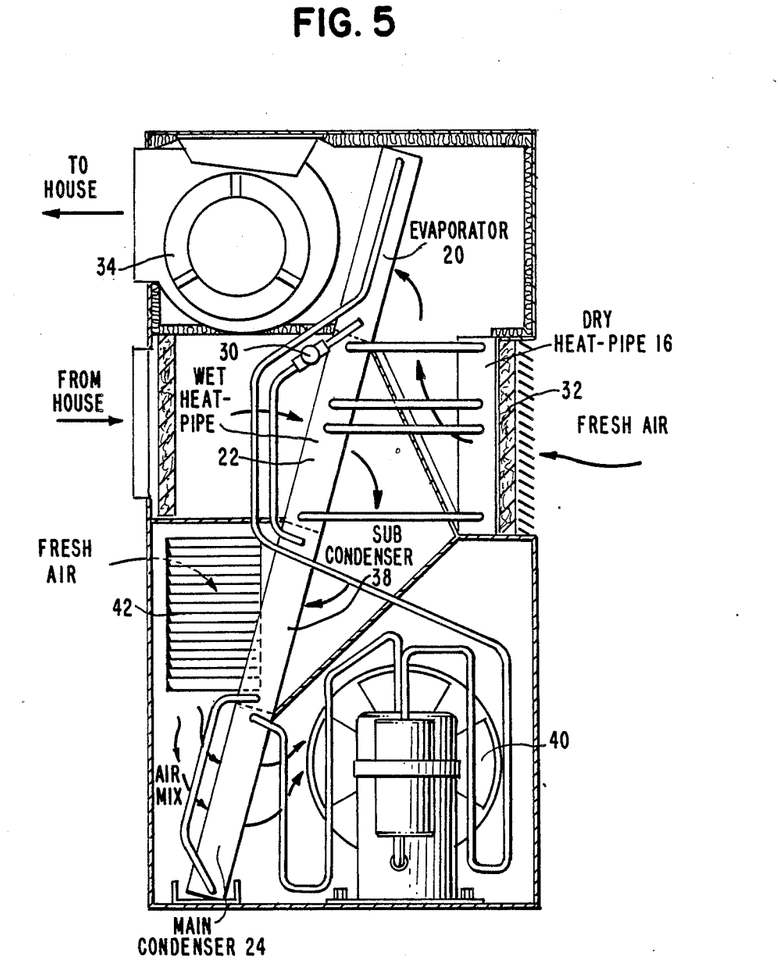
FIG. 5 is a side elevational view of a second embodiment of a system according to the present invention.
Figure 6:
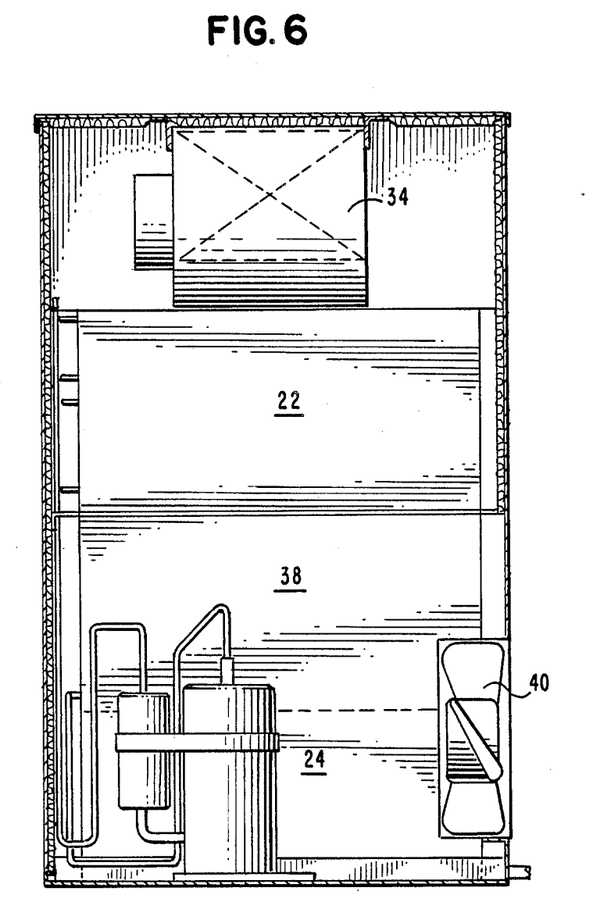
FIG. 6 is a part fragmentary view showing the placement of certain of the components of the system of FIG. 5.

FIGS. 5 and 6 show an embodiment of the invention in which the evaporator 20, heat pipe portion 22, sub-cooler 38 and condenser 24 are built as a single fin-coil so that the condensate from the evaporator can drip down onto the heat pipe portion 22, sub-cooler 38 and condenser 24 in that order. In this manner, the efficiency of the system is increased since it is possible to eliminate virtually all of the condensate in the outgoing air stream without adding energy to move the condensate from one location to another.

Except for the use of a single fin-coil for the evaporator 20, heat pipe portion 22, sub-cooler 38 and condenser 24, the embodiment of FIGS. 5 and 6 is substantially similar to that of FIG. 4. Some minor differences can be seen in the drawings, however, For example, a blower 34 is provided to draw in the ingoing air stream. Here, the blower 34 is positioned to draw the air through both the heat pipe portion 32 and the evaporator 34 rather than to push the air through the evaporator 20 as in the embodiment of FIG. 4. Also, the orientation of the fan 40 is different in the different embodiments.

It will be noted that the heat pipe portions 22 and 32 in the embodiments of FIG. 4 and FIGS. 5 and 6 are on the same level so that the heat pipe can be operated in either direction depending on whether the ingoing air is to be cooled or heated. That is, the heat pipe operation is reversible. If it is not desired that the system be reversible, the levels of the heat pipe portions can be altered.

Figure 7:
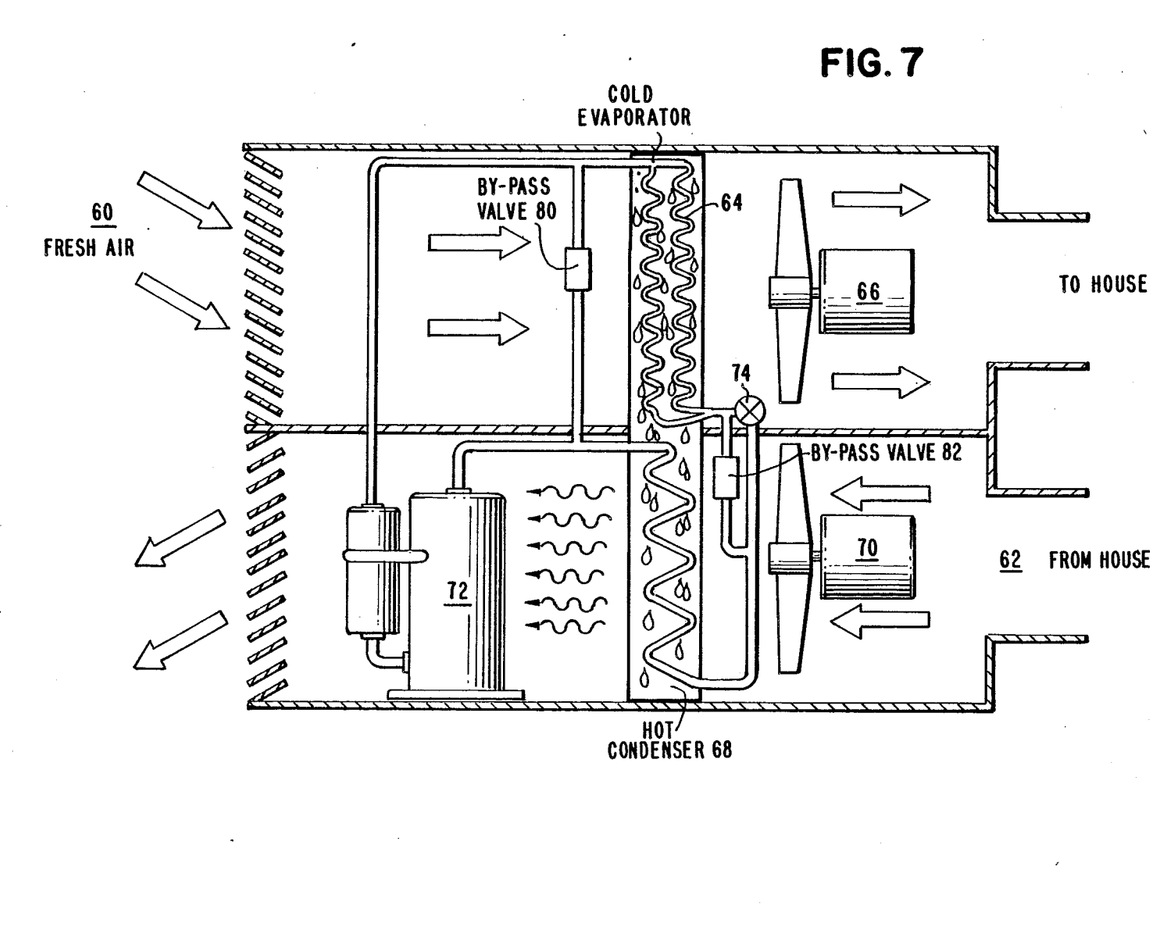
FIG. 7 is a schematic view showing a third embodiment of a system according to the present invention.

FIG. 7 shows a simplified version of the present invention wherein no separate heat pipe air-to-air heat exchanger is used. The embodiment of FIG. 7 includes an ingoing air stream 60 and an outgoing air stream 62. The ingoing air stream passes through the evaporator 64 of a conventional vapor compression cycle air conditioner. Movement of the ingoing air stream is effected by a fan 66.

The outgoing air stream 62 passes through a condenser 68 and past a compressor 72 of the vapor compression cycle air conditioner. The outgoing air stream is moved by a fan 70.

During summer periods when cooling of the incoming air is desired, the compressor 72 is operated to supply pressurized freon to the condenser 68 where it is liquified. The liquified freon is passed to an expansion valve 74 and into the evaporator 64 where it absorbs heat from the ingoing air stream. The evaporator and condenser are formed as a single fin coil so that condensate from the evaporator falls onto the condenser increasing the efficiency of this unit and increasing the humidity of the outgoing air stream. Thus a high efficiency air exchange is provided for mild weather conditions.

Two by-pass valves 80 and 82 are also provided. Valve 80 bypasses the compressor and valve 82 bypasses the expansion valve 74. Valves 80 and 82 are pressure actuated valves as described in my aforementioned U.S. application Ser. No. 110,420 filed Oct. 20, 1987. During the winter months when the compressor 72 is not actuated, valves 80 and 82 open to permit the evaporator 64 and condenser 68 to act as a closed loop heat pipe in which their functions are reversed. That is, liquid freon is evaporated in the condenser 68 by warm air from the house and condenses in the evaporator 64, releasing heat to the ingoing air. When the compressor 72 runs, the valves 80 and 82 close and the systems returns to its operation as a vapor compression cycle air conditioner.

While this invention has been illustrated and described in accordance with a preferred embodiment, it is recognized that variations and changes may be made therein without departing from the invention as set forth in the claims.

What is claimed is:

1. A system, comprising; an ingoing air path for receiving ambient ingoing air and channeling said ingoing air into a structure;
   first means mounted in said ingoing air path for moving air through said ingoing air path to provide said ingoing air to said structure;
   second means including a first heat exchange coil containing a heat exchange fluid for cooling the ingoing air to a temperature at which a condensate is formed;
   an outgoing air path for channeling outgoing air from said structure to atmosphere;
   third means mounted in said outgoing air path for moving air through said outgoing air path to exhaust said outgoing air from said structure;
   fourth means including a second heat exchange coil containing a heat exchange fluid for transferring heat to said outgoing air wherein the fourth means is a heat pipe, one end of which is positioned in the ingoing air path and the other end of which is positioned in the outgoing air path; and
   fifth means for channeling said condensate to said second coil to evaporatively cool said second coil.

2. The system of claim 1, wherein said fifth means includes a mounting structure for mounting said first coil over said second coil so that said condensate can drip from said first coil to said second coil.

3. The system of claim 2, wherein said first coil and said second coil share a common fin structure.

4. The system of claim 1, wherein the first means for moving air through said ingoing air path provides ingoing air to the structure at a first rate and the third means for moving outgoing air through said outgoing air path exhausts air from the structure at a second rate, less than the first rate, thereby providing a positive pressure in the structure.

5. The system of claim 1, wherein said first coil comprises an evaporator of a vapor compression cycle air conditioner and said second coil comprises a condenser of said vapor compression cycle air conditioner.

6. The system of claim 5 wherein said vapor compression cycle air conditioner includes a compressor, an expansion valve, and a fluid path, and further including means in said fluid path for selectively bypassing said compressor and said expansion valve so that said compressor and said evaporator form a closed loop heat pipe.

7. The system of claim 6 wherein said fifth means for channeling said condensate from said ingoing air path to said second coil includes a mounting structure for mounting said evaporator over said condenser so that said condensate can drip from said evaporator to said condenser.

8. The system as claimed in claim 1 wherein said second means includes a third heat exchange coil and said fourth means includes a fourth heat exchange coil, said first and fourth heat exchange coils being in fluid communication in a vapor compression cycle air conditioning system, and said second and third heat exchange coils being in fluid communication in a heat pipe.

9. The system as claimed in claim 8 wherein said second and third heat exchange coils are on substantially the same vertical level so that either said second coil or said third coil can operate as an input coil to said heat pipe.

10. An air conditioning process, for a building structure, comprising the steps of:
    (a) moving ambient air into a building structure through an ingoing air path;
    (b) precooling the ambient air by means of a precooling heat pipe;
    (c) moving the precooled air to an evaporator, where the air is further cooled and forms a condensate;
    (d) circulating the cooled air within the building;
    (e) blowing the cool and outgoing air from the building across a wet heat pipe wetted by condensate from the evaporator; and
    (f) mixing the outgoing air with fresh air as the outgoing air moves across a condenser.

11. The process of claim 10, further comprising the step of wetting the outgoing air by condensate from the precooling heat pipe.

12. The method of claim 10 in which the ingoing air stream is channeled into the building structure at a higher rate than the outgoing air stream, to create a positive pressure within the building structure.

* * * * *